No. 11,833. Reissued June 26, 1900.

J. A. SCHNEIDER.

SHEET IRON STOVE.

(Application filed Feb. 1, 1900.)

WITNESSES

Frank Dunz.

Lee Auberg

INVENTOR

John A. Schneider

By Fisk & Thomas

Attorneys

THE NORRIS PETERS CO., PHOTO-LITHO., WASHINGTON, D. C.

UNITED STATES PATENT OFFICE.

JOHN A. SCHNEIDER, OF BRAMPTON, CANADA, ASSIGNOR, BY DIRECT AND MESNE ASSIGNMENTS, TO THE ENTERPRISE STOVE COMPANY, OF DETROIT, MICHIGAN.

SHEET-IRON STOVE.

SPECIFICATION forming part of Reissued Letters Patent No. 11,833, dated June 26, 1900.

Original No. 613,731, dated November 8, 1899. Application for reissue filed February 1, 1900. Serial No. 3,656.

*To all whom it may concern:*

Be it known that I, JOHN A. SCHNEIDER, a subject of Her Majesty the Queen of Great Britain, residing at Brampton, in the county of Peel and Province of Ontario, Canada, have invented a certain new and useful Improvement in Sheet-Iron Stoves; and I declare the following to be a full, clear, and exact description of the invention, such as will enable others skilled in the art to which it pertains to make and use the same, reference being had to the accompanying drawings, which form a part of this specification.

My invention relates to improvements in heating devices; and its object is to provide means for so introducing the draft to the heater that the cold air, taken, preferably, from the floor, will be first passed through a heated conductor and then projected downward upon the fuel.

My invention is shown in the accompanying drawings, in which—

Figure 1:
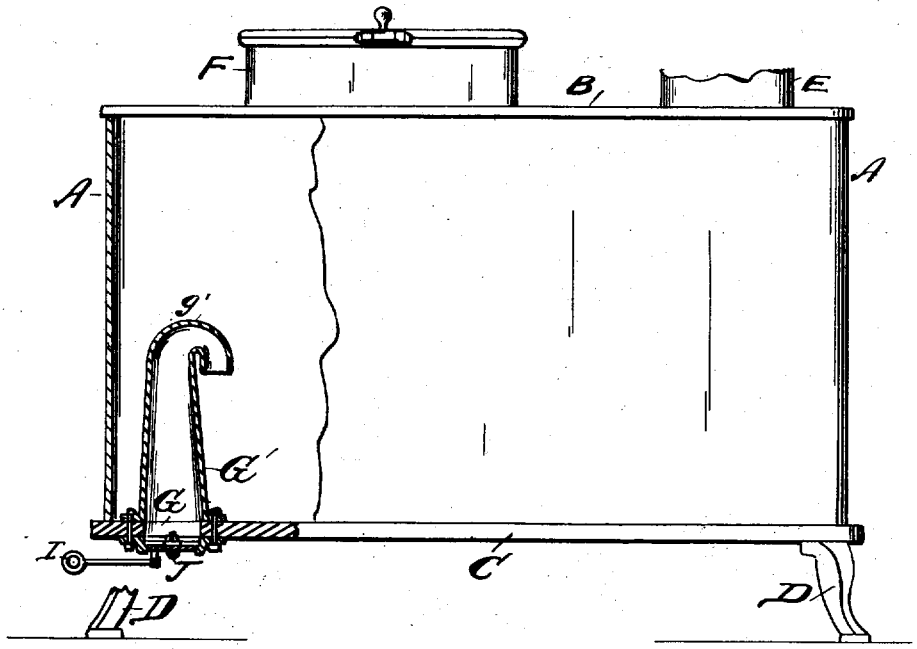
Figure 2:
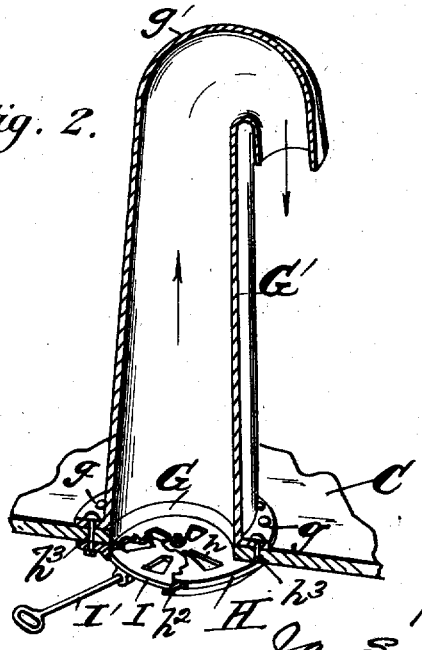

Figure 1 is a side elevation, partly in section, of a plain sheet-iron heating-stove; and Fig. 2 is an enlarged sectional view of the conductor-pipe through which the draft is introduced to the stove.

In the drawings, A represents the body of the stove or heater, which may be made of sheet-iron or cast-iron, as preferred, with the usual opening at the top or sides for the introduction of the fuel.

In the drawings, B represents the top plate of the stove; C, the bottom; E, the smoke-pipe, and F the top opening through which to introduce the fuel in the form of stove shown.

G′ is a pipe, preferably made of cast-iron, connected at the bottom with an opening G through the bottom of the stove and provided at the top with the reverse bend $g'$ and at the bottom with the flange $g$, through which the pipe is attached to the bottom of the stove.

H is a plate secured to the bottom of the stove and provided with openings $h$ and with a depending flange $h^2$, by means of which the plate is secured at the bottom of the stove by the bolts $h^3$.

I is a perforated circular damper fitted within the flange $h^2$ and pivoted on a bolt J at the center of the plate H in the manner common to dampers of this class.

I′ is an operating-handle for the damper.

By means of the construction above described the air for use in the combustion of the fuel is conducted from near the floor, where it is the coldest, through the pipe G′, where it is heated and from which it is delivered upon the top of the fuel in a downwardly-moving blast. The method for providing the draft from the heater has several advantages. The coldest and foulest air in the room is used. It is heated by using the heat direct from the center field or fuel-chamber of the stove, that would be otherwise wasted, and when so heated is delivered to the fuel in such a way as to cause it to burn without forcing or drawing the gases thrown off by the burning fuel to the chimney unburned. The value of the top draft as a means for producing more perfect combustion and preventing smoke thereby is well understood, and the means shown herein for taking such draft from the floor of the room and delivering it to the top of the fuel in a heated state gives an advantage over the ordinary top-draft heaters.

I do not desire to limit my invention to any one class of heaters, as the same can be used in stoves, furnaces, or boilers and for either wood, coal, or other fuel burners.

What I claim is—

1. In a heater, a draft-conductor leading from the bottom of the heater up through the center field or fuel-chamber and provided with a reverse turn to adapt it to deliver the air upon the fuel, substantially as described.

2. In a heater, the upstanding draft-conductor located within and away from the walls of the stove and within the center field or fuel-chamber and arranged to deliver the air for combustion downward upon the fuel, substantially as described.

3. In a sheet-iron wood-stove, in combination an imperforate band, a top provided with a stovepipe and wood-supply opening and a bottom having a pipe extending upwardly from a hole in the same at the opposite end to which the stovepipe is situated and provided with a downwardly-bent end or elbow as and for the purpose specified.

4. In combination an imperforate band, a top provided with stovepipe and wood-supply openings, a bottom provided with a suitable hole at the opposite end to which the stovepipe is situated, a cast-iron pipe provided with a lower flange and a bent downwardly-projecting upper end or elbow, a plate provided with openings and bolts extending through the bottom of the stove and bottom flange of the pipe, and a circular damper pivoted on the plate with openings and provided with a handle for manipulation as and for the purpose specified.

In testimony whereof I sign this specification in the presence of two witnesses.

JOHN A. SCHNEIDER.

Witnesses:

GEO. WILLIAMS,

EDUARD BARLOW.